(No Model.)
A. ADAIR, Jr.
FRAME FOR SUPPORTING CAR FENDERS.
No. 572,394. Patented Dec. 1, 1896.
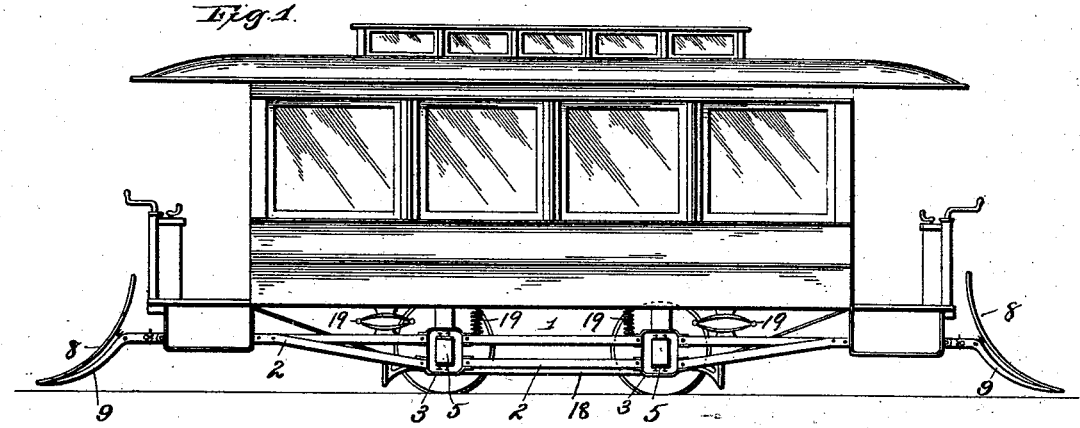
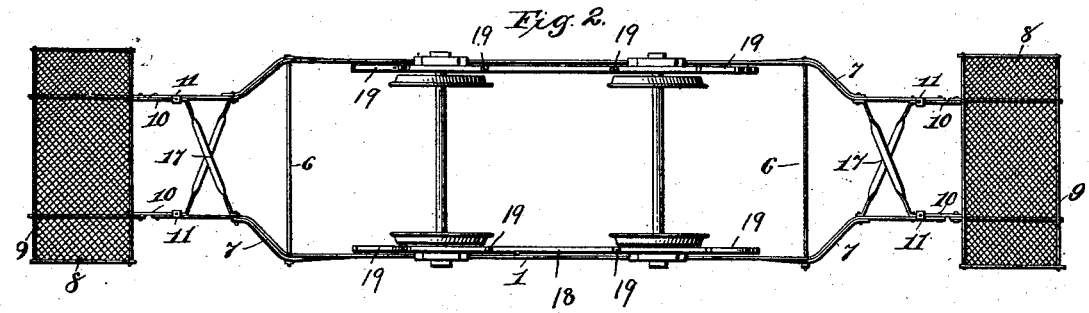
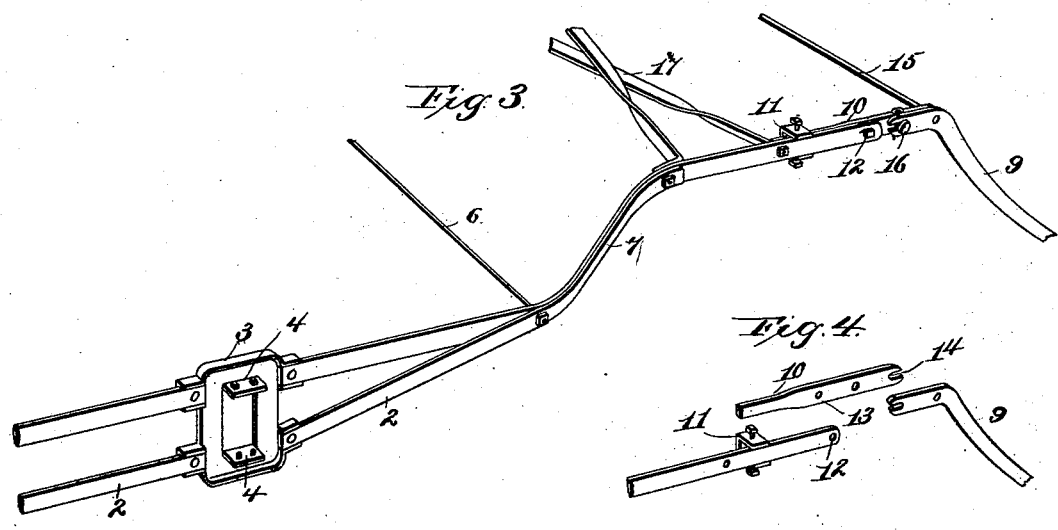
Witnesses
E. C. Wurdeman
S. F. Williamson
Inventor
Alexander Adair Jr.
by Geo. H. Holgate
Attorney

United States Patent Office.

ALEXANDER ADAIR, JR., OF PHILADELPHIA, PENNSYLVANIA.

FRAME FOR SUPPORTING CAR-FENDERS.

SPECIFICATION forming part of Letters Patent No. 572,394, dated December 1, 1896.

Application filed March 28, 1896. Serial No. 585,164. (No model.)

*To all whom it may concern:*

Be it known that I, ALEXANDER ADAIR, Jr., a citizen of the United States, residing at Philadelphia, in the county of Philadelphia and State of Pennsylvania, have invented certain new and useful Improvements in Frames for Supporting Fenders for Trolley-Cars, of which the following is a specification.

My invention relates to a new and useful improvement in frames for supporting fenders for trolley-cars and the like, and has for its object to so construct such a frame as to adapt it for attachment to the truck of any car without the use of bolts and the like, so that the fender supported thereby will not be subject to the oscillatory movements of the car-body; and with these ends in view my invention consists in the details of construction and combination of elements hereinafter set forth and then specifically designated by the claims.

In order that those skilled in the art to which my invention appertains may understand how to make and use the same, I will describe its construction and operation in detail, referring by number to the accompanying drawings, forming a part of this specification, and in which—

Figure 1 is a side elevation of a car having my improvement attached thereto; Fig. 2, a plan view of a truck with my improved support in position; Fig. 3, a detailed perspective of one portion of the frame, showing the general formation of the frame and means for attachment to the truck; and Fig. 4, a detailed perspective and the means for coupling one form of fender to my improved support.

Similar numbers denote like parts in all the views of the drawings.

Heretofore considerable inconvenience has been occasioned in so attaching a fender to the ordinary trolley-car as to prevent the oscillations of the body of said car from being imparted to the fender. This disadvantage I overcome by constructing a framework adapted to be connected to the truck of the car and extend beyond each end of the body thereof, so that a fender attached to each of these ends will counterbalance one another. This I accomplish in the following manner:

1 is a frame of approximately rectangular shape, the sides of which are made rigid and braced by means of the trestle-bars 2, and secured to these trestle-bars and the side bars of the frame are suitable yokes 3, adapted to embrace the boxes 5 of the truck 18, and 4 are flanges projecting at right angles from the yokes through which are holes for the purpose of permitting the passage of bolts for securing the frame to the car-truck, if desired; but in practice I find that by placing the yoke over the boxes and drawing the frame together by the cross-rods 6 said frame will be firmly secured upon the truck. Each end of the frame is reduced in width at 7 by the side bars thereof being curved inward for the purpose of avoiding the steps of the car, and these reduced portions of the frame extend beyond each end of the car so as to receive and support the fenders without interference with the platform or draw-head.

While any style of fender may be attached to and supported by my improved frame, I have shown a desired form of fender which consists of a concave frame 8, which may be covered by any suitable netting for reducing the violence of impact of a person coming in contact with said frame. These concave frames are pivoted at their lower ends to the curved bars 9, which are coupled to the side bars of the frame 1 by means of a clamp-block 10, one end of each being adapted to pass in a socket 11 and be secured by suitable bolts passing through the holes 12 and 13. The forward ends of these blocks are notched at 14 for the purpose of embracing the cross-rods 15, and a pin 16 serves to further secure and adjust the curved bars 9 for determining the normal position of the fender. I prefer to brace the reduced portions of the frame 1 by the cross-rods 17. From this it will be seen that a frame of this construction may be readily secured to the truck of a car by loosening the rods 6, passing the yokes over the boxes and tightening said rods, and when the frame is in this position no oscillation of the car-body is imparted thereto, and consequently the fenders are maintained in their normal adjustment above the road-bed without danger and contact therewith.

Slight modifications might be made in the construction herein described without departing from my invention, and I therefore do not wish to be understood as limiting myself to this exact construction.

Having thus fully described my invention, what I claim as new and useful is—

1. In a device of the character described, a fender-frame support, a rod pivoted thereon, a socket secured on said support adapted to receive one end of the rod, a fender-frame removably secured to the end of the rod and set-screws threaded in the socket to adjust the tilt of the rod, as and for the purpose described.

2. A frame supporting a fender in combination with the truck of a car, consisting of side bars, trestle-bars and yokes, the latter being adapted to embrace the boxes of said truck and extensions of less width than the main frame projecting beyond the ends of the car substantially as shown and described.

3. A frame for supporting a fender consisting of side bars, trestle-bars and yokes adapted to embrace the boxes in which the axles are journaled, cross-rods connecting said side bars and adapted to clamp them together, as and for the purpose described.

4. A frame for supporting a fender at either end thereof, consisting of side bars, trestle-bars and yokes, the latter being adapted to embrace the boxes in which the axles are journaled and be secured to said boxes substantially as and for the purposes set forth.

5. A frame for supporting a fender, consisting of side bars, trestle-bars secured thereto, yokes attached between the side bars and trestle-bars, cross-rods connecting the side bars and adapted to clamp them together, said side bars having extensions of less width than the main frame and brace-rods connecting said extensions, as and for the purpose described.

6. A frame for supporting a fender having yokes to embrace the boxes of an ordinary frame and cross-rods to clamp the yokes together, as and for the purpose described.

7. In a device of the character described, a fender-frame support, a socket secured thereon, set-screws threaded in the socket, an arm pivoted to the support having one end extending between the ends of the set-screws, said arm having a slot cut in its other end and a lug projecting from its side, a fender-frame having a slot in its end to engage the lug on the arm and a cross-bar connecting the sides of the fender-frame to be engaged by the slot in the arm, as and for the purpose described.

8. In a device of the character described, a frame for supporting a fender-frame provided with yokes adapted to embrace the axle-boxes of a truck and having flanges provided with set-screws for engaging said axle-boxes, as and for the purpose described.

In testimony whereof I have hereunto affixed my signature in the presence of two subscribing witnesses.

ALEXANDER ADAIR, Jr.

Witnesses:
S. S. WILLIAMSON,
F. MATTHER.